(12) United States Patent
Schindler et al.

(10) Patent No.: US 6,733,065 B2
(45) Date of Patent: May 11, 2004

(54) CONTROL PROCESS FOR THE AUTOMATIC CLOSING OF A CONVERTIBLE TOP OF A MOTOR VEHICLE

(75) Inventors: Thomas Schindler, Groseheirath (DE); Achim Kullmann, Bamberg (DE); Christof Vollkommer, Sesslach (DE)

(73) Assignee: Brose Fahrzeugteile GmbH & Co., KG, Coburg (DE)

( * ) Notice: Subject to any disclaimer, the term of this patent is extended or adjusted under 35 U.S.C. 154(b) by 0 days.

(21) Appl. No.: 10/226,371

(22) Filed: Aug. 21, 2002

(65) Prior Publication Data

US 2003/0052635 A1 Mar. 20, 2003

(30) Foreign Application Priority Data

Aug. 21, 2001 (DE) .......................... 101 39 951

(51) Int. Cl.$^7$ .................................................. B60J 7/00
(52) U.S. Cl. ............................. 296/107.07; 296/146.14
(58) Field of Search ...................... 296/107.07, 146.14, 296/201

(56) References Cited

U.S. PATENT DOCUMENTS

| | | | | |
|---|---|---|---|---|
| 5,110,175 A | * | 5/1992 | Fischbach | 296/117 |
| 6,054,821 A | * | 4/2000 | Koch et al. | 318/266 |
| 6,601,905 B1 | * | 8/2003 | Klauzenberg et al. | 296/107.07 |

FOREIGN PATENT DOCUMENTS

DE   100 02 466 A1   11/2001

* cited by examiner

*Primary Examiner*—Joseph D. Pape
(74) *Attorney, Agent, or Firm*—Christie, Parker & Hale, LLP

(57) ABSTRACT

A control process for the automatic closing of a convertible top of a motor vehicle. The motor vehicle has moveable front side window panes and rear side window panes. Prior to the closing of the top, at least the rear side window panes are moved into a position that is characterized by a pre-definable aperture between the edge of the respective side window pane and the closed top.

9 Claims, 3 Drawing Sheets

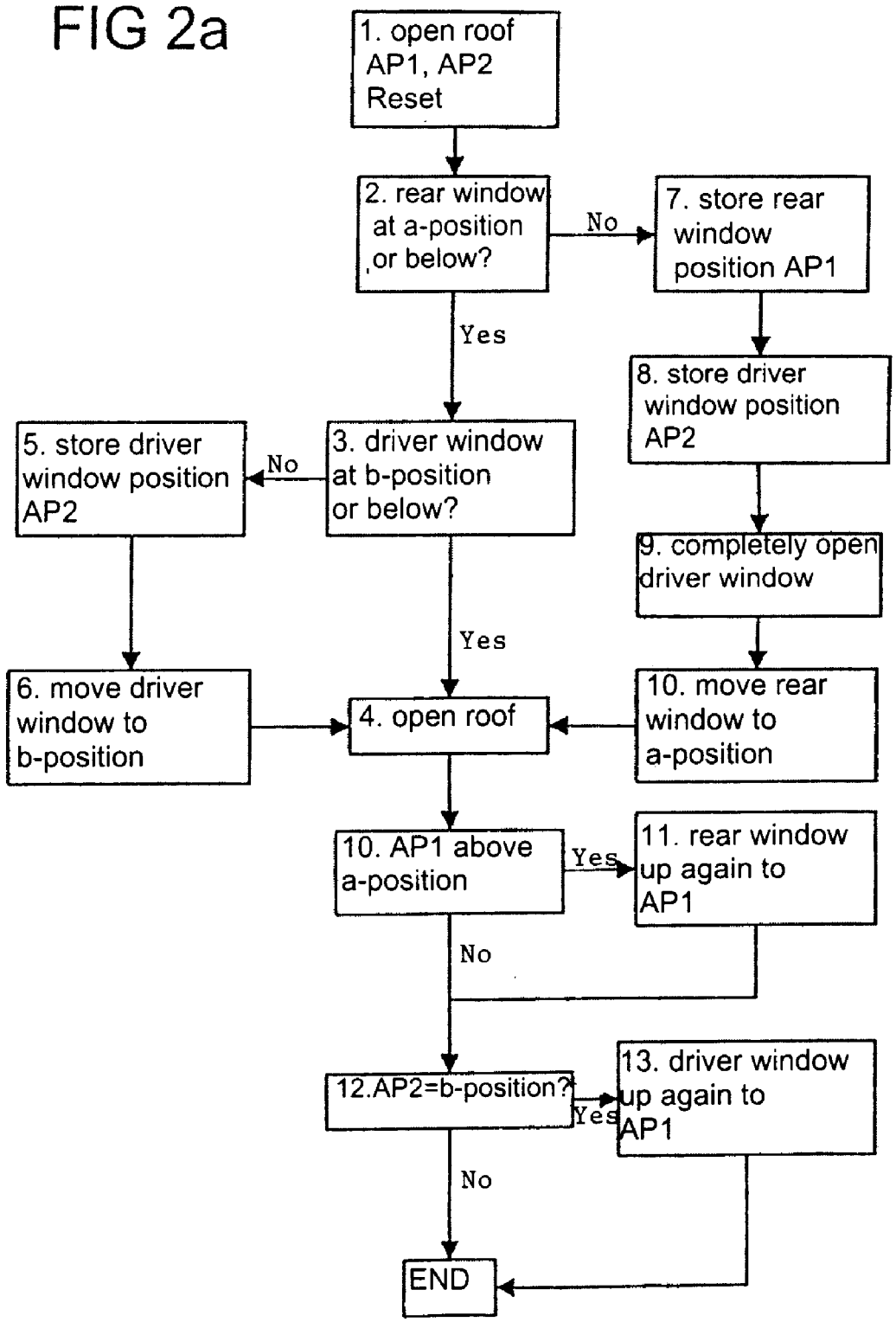

CONTROL PROCESS FOR THE AUTOMATIC CLOSING OF A CONVERTIBLE TOP OF A MOTOR VEHICLE

CROSS-REFERENCE TO RELATED APPLICATION

This application claims priority of German Patent Application number 101 39 951.0-21, filed Aug. 21, 2001.

FIELD

The invention concerns a control process for the automatic closing of a convertible top of a motor vehicle.

BACKGROUND

A process for the adjustment of a motor vehicle window equipped with anti-trap protection, particularly the window of a coupe or a convertible, is known from DE 100 02 466. When the window is partially opened, there is a shearing aperture between a lateral window edge and an associated window edge of another window or a body part that is closed during the closing of the window by a displacing the window pane vertically and horizontally. In order to prevent trapping in the shearing aperture, the window is initially moved only vertically, and subsequently, during the last phase of the closing movement only, the window pane is moved in an essentially horizontal or a rotational motion around the lateral axis. However, this process requires a high outlay for the detection of a trapping incident within the shearing aperture and is very expensive for a simple automatic closing mechanism for a convertible top.

SUMMARY

The object of the invention is to provide a control process for the closing of a top of a convertible motor vehicle, or the like, that allows a closing of the convertible top and the side windows of the motor vehicle, while increasing protection against the inadvertent entrapment of passengers' body parts without necessitating the use of anti-trap detection devices.

According to the invention, a control process is utilized for the automatic closing of a convertible top of a motor vehicle. The motor vehicle has moveable front side window panes and moveable rear window panes. Before the top is closed, at least the rear window panes are moved into a position characterized by a preset aperture between the edge of the relevant rear window pane and the closed top. The position is particularly defined by a preset positioning range that is determined depending on the precision of the positioning of the side window.

The width of the aperture is preset in such a manner that the danger of fatal injuries to passengers can be excluded. The width of the aperture is such that there is no risk of injuring the wrist arteries, the head, or the neck. The risk of injury to fingers or the like is significantly reduced. In principle, a risk of becoming caught between the front and the rear windows does exist. Critical, however, is the risk of becoming caught between the already closed tensioned top and the upper edges of the side windows during the lifting of the side window panes. The minimal width of the aperture is designed such that the closing of the top is possible after moving the rear side window panes into the position for the process. Consequently, the width of the aperture allows for easy closing of the top without the rear side window panes needing to be completely pressed into the gaskets arranged on the top.

Advantageously, the width of the aperture is preset depending on the thickness of the body parts that may become caught between the edges of the window panes and the convertible top. As such, the width of the aperture does not exceed 20 mm. Preferably, the maximum width of the aperture is less than 12 mm, so that, according to regulations, the window pane may be closed without the use of a protective anti-trap device.

In one embodiment of the invention, the first step in setting the window pane position to the position characterized by the aperture is to determine the actual window pane position. Thereafter, this actual window pane position is compared with the stored, calculated nominal position for the release of the close command of the top. Subsequently, the movement of the window pane is controlled using this comparison until the window position and the nominal position essentially match.

To achieve the desired tolerance of this position, i.e., the tolerance of the aperture between the edge of the side pane and the top, corresponding devices and controls are used to move the side panes. For instance, if a precise positioning of the side window pane is desired, one of a position switch and a path-sensor is used. These devices are particularly used for the positioning along a major adjusting path of several centimeters or decimeters. Alternatively, for a short adjustment path of a few millimeters, e.g., 20 mm, a time control device is used for the displacing of the side window pane.

In a preferred embodiment of the invention, at least the rear window panes are lowered for displacement to the roof closing position before the top is closed. This is particularly advantageous if, with an open top, the side window panes are adjusted to their topmost position. Then, the side window panes are lowered by the maximum width of the aperture until they reach the preset position. A precise low-tolerance displacement of the side window pane can be achieved over this short adjustment path by means of a time control device. Trapping is impossible during this opening motion of the side window pane.

In order to make use of a reference position for the precise positioning of the side window pane, first, the rear window panes are moved into the upper stop position as a reference position. Then, the side window panes are positioned by lowering them for a defined time interval.

In another embodiment, the risk of trapping body parts within the shearing aperture can be reduced by lowering the front side window panes into a low opening position prior to the closing of the top and prior to the moving of the rear side window panes. The low opening position prevents shearing forces by creating the shortest or the largest shearing aperture possible. Preferably, the lowest opening position of the front side window panes is such that the front side window panes are moved against the lower stop.

Shearing forces typically occur when the shearing aperture is closed by the upward displacement of the rear window pane. In another embodiment of the invention, the front window panes are lowered into the low opening position only when the rear side window panes are displaced upwards into position or into the upper stop position. If all the side windows panes are in the lowest opening position prior to closing the top, the rear window panes are moved into the preset position first. Then, the top is closed by means of a motor. Subsequent to or simultaneously with the closing of the top, the front side window panes are displaced upwards. After the top is closed, the front and the rear side window panes are displaced beyond the preset position into the respective gasket mounted to the top.

Another embodiment of the invention provides that, if the front window panes are not equipped with an anti-trap device, prior to the closing of the top, the front side window panes, and the rear side window panes are moved into the position with a preferred aperture width of 12 mm.

In another embodiment, at least the front side window panes are closed after the closing of the top, and an anti-trap device is activated for the closing of the front side window panes, after the closing of the top.

BRIEF DESCRIPTION OF THE DRAWINGS

The invention is explained in detail in the following with reference to exemplary embodiments depicted in the drawings.

The drawings depict:

FIG. 2a: a flow chart for the process for the opening of the roof of the motor vehicle.

DETAILED DESCRIPTION OF THE INVENTION

Figure 1A:
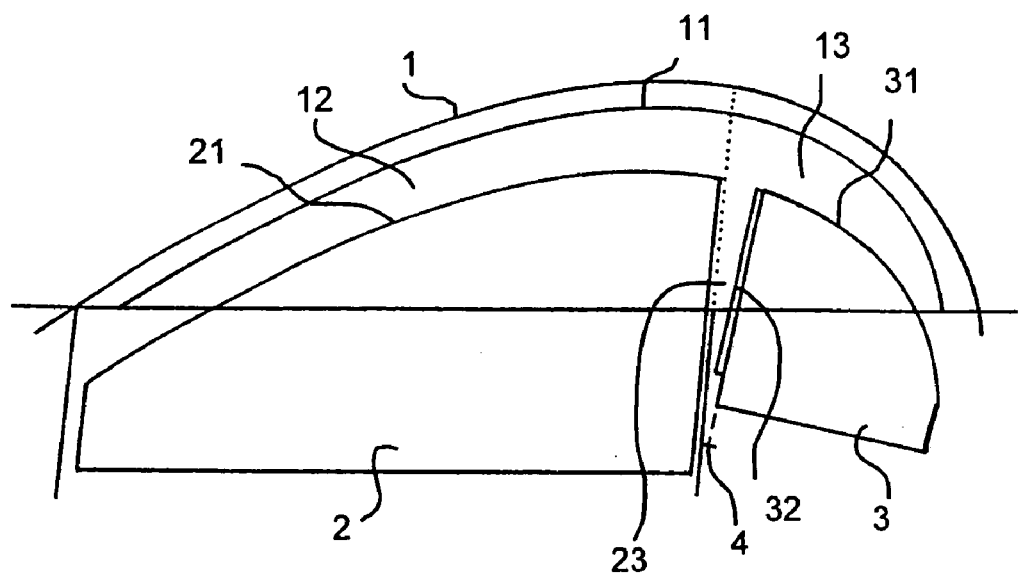
FIG. 1a: a schematic view of a convertible top and a partially opened front window pane and rear side window pane of a convertible motor vehicle.

FIG. 1a shows a section of a schematic depiction of a convertible motor vehicle. Depicted is the roof 1 or top 1 on which a gasket 11 is arranged. The gasket 11 has a sealing effect (not shown in FIG. 1) with the edge 21 of the front side window pane 2 and the edge 31 of the rear side window pane 3 (the rear window 3) when, in closed position, they are inserted into the gasket 11. FIG. 1a depicts the side window panes 2 and 3 in a low opening position which creates broad openings 12 and 13 between the edges 21 and 31 and the gasket 11 of the top 1, respectively.

The side window panes 2 and 3 are, for example, moved into the position depicted when the top 1 is to be opened. In a following opening process step, the top 1 is automatically moved back, without needing additional force to separate the gasket 11 and the edges 21 and 31 of the side window panes 2 and 3. In this opening position, a shearing aperture 23 is formed between the front side window pane 2 and the rear window 3, so that during the upward displacement of the side window pane 3, a body part of a passenger could become trapped between a window gasket 32 mounted to the rear window 3 and the front side window pane 2. During this displacement motion, the rear window 3 makes linear and pivotal movements around the pivot point 4.

Figure 1B:
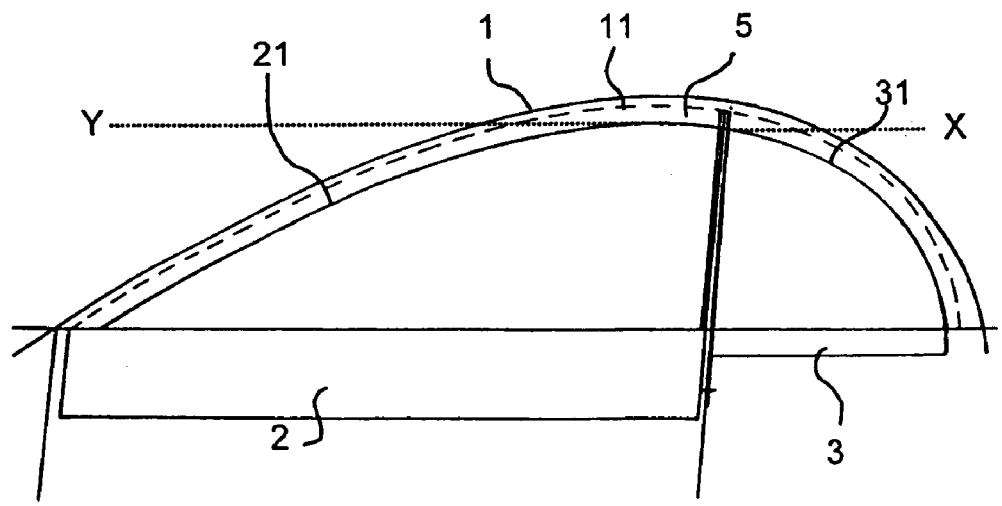
FIG. 1b: a schematic view of the top, the front side window pane, and the rear window pane in a preset position for the closing of the top of a convertible motor vehicle.

FIG. 1b depicts the situation shortly before the completion of the closing process of the top 1. The front side window pane 2 is in the position y, preset for the closing of the top 1, and the rear window 3 in the position x, preset for the closing of the top 1. The panes 2 and 3 have been previously moved into the positions x and y. An aperture 5 remains between the window edge 31 of the rear window 3 and the gasket 11 of the top 1. On the one hand, this aperture 5 allows the closing of the top 1. The top 1 is depicted in FIG. 1b in its closed position. On the other hand, the aperture 5 is sufficiently small to prevent the insertion of body parts, in particular fingers of passengers, into this aperture 5.

Figure 2B:
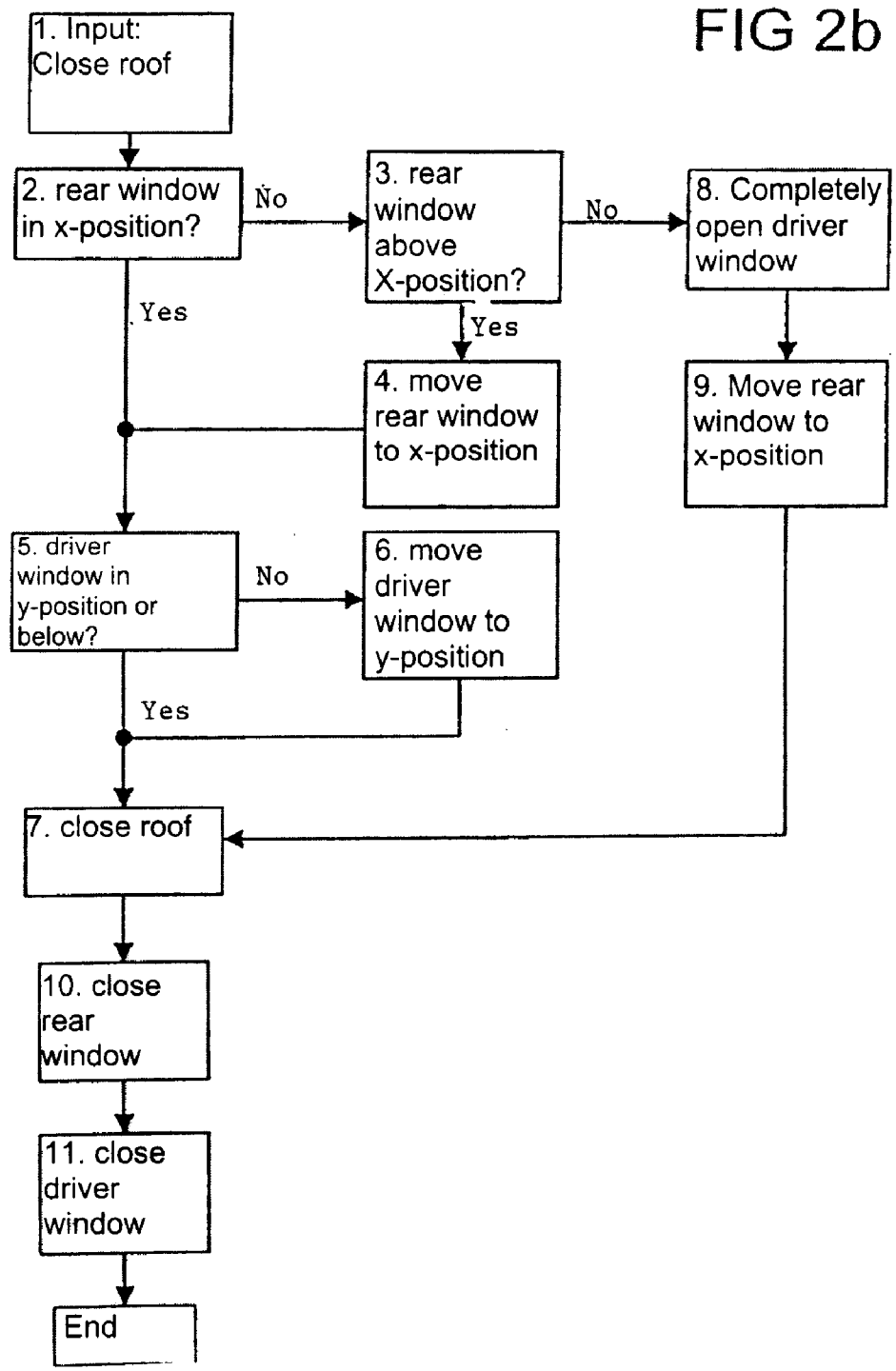
FIG. 2b: a flow chart for the process for the closing of the roof of the motor vehicle.

If, for example, the top 1 should be closed prior to approaching rain, the window panes 2 and 3 are first displaced into at least one position to the extent that the window panes 2 and 3 do not hinder the closing of the top 1. Such a closing process is depicted schematically in FIG. 2b in the form of a flow chart. Because the lever arms of the closing mechanism of the top 1 are relatively large, it may be problematic to close the top 1 and to simultaneously move window panes 2 and 3 into the gasket 11 arranged on the top 1. However, the process depicted in FIG. 2b may be advantageously used in order to minimize the risk of trapping body parts.

In the first step 1, a command for closing the roof 1 or the top 1 is generated. This may be achieved, for example, by activating a switch or a remote control or by a rain detector detecting falling rain.

In step 2, a determination is made as to whether the rear side window pane 3 is in the x-position or below the x-position. The x-position is the previously explained position x of the rear window 3 which reduces the risk of entrapping body parts while simultaneously allowing for the closing of the top 1. If, the rear window 3 is in the range of position x, process step 5 follows; otherwise, step 3 checks whether the rear window 3 is located above the x-position. If the rear window 3 is located above the x-position, the rear window 3 is lowered into the x-position in step 4.

In the following step 5, the position of the front side window pane 2 is determined and compared to the y-position. The y-position is the previously explained position of the front window 2 which reduces the risk of entrapping body parts while simultaneously allowing for the closing of the top 1. If the front side window pane 2 is in the y-position or below the y-position, the roof 1 is subsequently closed in step 7. Otherwise, if the front side window pane 2 is above the y-position, the front side window pane is moved into the y-position in step 6 and, the roof 1 is closed in step 7.

If, in step 3, it is determined that the rear window 3 is below the x-position, the rear window 3 must be moved up into the x-position. To accomplish this, the driver side window pane 2 or the front window pane 2 is completely opened in step 8 until it reaches the lower stop. Since now a trapping of body parts in the shearing aperture is no longer possible, the rear window 3 is subsequently moved into the x-position in step 9, and the roof 1 is then closed in step 7.

In step 10, the rear window 3 is completely closed without the of risk of trapping any body parts, and the front window pane 2 (driver side) is subsequently closed in step 11. Any trapping during the closing of the front window pane 2 is detected by an anti-trapping algorithm, and in the event of a detected trapping, the moving window is stopped or reversed such that the trapped passenger is not injured.

The previously presented exemplary embodiment has the advantage that no anti-trap device is required for the rear side window panes 3 (the rear pane 3) and that, nevertheless, the roof 1 can be closed automatically without any risk of trapping, without having to first close the side window panes 2 and 3 manually.

FIG. 2a schematically depicts a process for the opening of a top 1. In the first step 1, a command for opening the roof 1 or the top 1 is generated. This may be done, for example, by activating a switch or a remote device. The stored old-positions AP1 and AP2 are deleted or overwritten.

In step 2, the position of the rear window 3 is determined. If the rear window 3 is in the a-position or below the a-position, the position of the driver side window pane 2 is then checked in step 3. If the driver side window pane 2 is in the b-position or below the b-position, the roof 1 is then automatically opened in step 4.

If it is determined in step 3 that the driver side window pane 2 is above the b-position, in step 5 the old driver side window pane 2 position AP2 is stored in order to automatically move to it subsequently or during a future opening of the roof 1. Subsequently, the driver side window pane 2 is moved into the b-position, and the roof 1 is opened in step 4.

If it is determined in step 2 that the rear window 3 is above the a-position, the rear window position AP1 is stored in step 7 prior to the displacing of rear window 3 in step 10. Likewise, the driver side window pane 2 position AP2 is stored in step 8. In step 9, the driver side window pane 2 is subsequently completely opened in order to prevent trapping of body parts in the shearing aperture 23 during the upward displacement of the rear window 3 in step 11. Subsequent to or simultaneously with step 9, the rear window 3 is adjusted to the a-position and the top 1 is opened in step 4.

Subsequently, in steps 10 to 13, the window panes are moved back to their previous positions AP1 and AP2 if those differ from the a-position or from the b-position.

What is claimed is:

1. A control process for an automatic closing of a top of a motor vehicle, wherein the motor vehicle has movable front side window panes and movable rear side window panes, comprising, prior to closing of the top, moving the rear side window panes into a position that forms a predefineable aperture between an edge of the respective rear side window pane and the closed top.

2. The control process according to claim 1, further comprising comparing the current window pane position with a nominal position for a release of a closing command for the top and controlling movement of the window pane based on the comparison.

3. The control process according to one of the claim 1 or 2, wherein moving, prior to the closing of the top, comprises lowering at least the rear side window panes to the position.

4. The control process according to claim 3, wherein moving comprises, first, moving the rear side window panes into an upper stop position and, then, lowering the rear side window panes to the position.

5. The control process according to claim 1, further comprising lowering the front side window panes into a low opening position prior to the closing of the top and prior to any displacement of the rear side window panes.

6. The control process according to claim 3, further comprising lowering the front side window panes into a low opening position only if the rear side window panes are displaced upwards into one of the position and an upper stop position.

7. The control process according to claim 1, wherein the width of the aperture does not exceed 20 mm.

8. The control process according to claim 1, further comprising, prior to the closing of the top, displacing the front window panes into a position that forms a predefinable aperture between an edge of the respective front window pane and the closed top.

9. The control process according to claim 1, further comprising closing of the top, then closing at least the front side window panes, and for the closing of the front side window panes, activating an anti-trap device.

* * * * *